US005448268A

United States Patent [19]

Cho

[11] Patent Number: 5,448,268

[45] Date of Patent: Sep. 5, 1995

[54] MANUAL PAPER LOADING DEVICE

[75] Inventor: Hae-Suk Cho, Suwon, Rep. of Korea

[73] Assignee: SamSung Electronics Co., Ltd., Suwon, Rep. of Korea

[21] Appl. No.: 814,043

[22] Filed: Dec. 26, 1991

Related U.S. Application Data

[63] Continuation of Ser. No. 551,470, Jul. 12, 1990, abandoned.

[30] Foreign Application Priority Data

Nov. 15, 1989 [KR] Rep. of Korea ............... 16866/1989

[51] Int. Cl.[6] ............................................ G01D 15/24

[52] U.S. Cl. ..................................... 346/134; 271/164

[58] Field of Search .................... 346/134; 271/9, 162, 271/164; 400/625, 629; 355/308, 309, 317

[56] References Cited

U.S. PATENT DOCUMENTS

| | | | |
|---|---|---|---|
| 4,429,863 | 2/1984 | Itoh et al. | 271/9 |
| 4,511,904 | 4/1985 | Takahashi et al. | 346/134 |
| 4,540,297 | 9/1985 | Imaizumi et al. | 400/625 |
| 4,871,160 | 10/1989 | Yoshino | 271/9 |
| 4,896,871 | 1/1990 | Idenawa | 271/9 |

*Primary Examiner*—Leo P. Picard
*Assistant Examiner*—Christopher Horgan
*Attorney, Agent, or Firm*—Robert E. Bushnell

[57] ABSTRACT

A manual paper-loading device is disclosed. The device has a manual paper feeder for manually delivering the papers therein into an electrostatic printer without delivering the papers piled up in an automatic paper loading tray into the electrostatic printer. The paper-loading device disclosed has a roll having uniform radius in contrast to a conventional pick-up roll having nonuniform radii.

20 Claims, 3 Drawing Sheets

MANUAL PAPER LOADING DEVICE

This is a Continuation of application Ser. No. 07/551,470 filed on 12 Jul. 1990, now abandoned.

BACKGROUND OF THE INVENTION

1. Field of the Invention

The present invention relates to a manual paper-loading device for an electrostatic printer such as a copying machine, laser printer, etc. More particularly, the invention relates to a paper-loading device having a manual paper feeder for manually delivering irregular-sized paper into the electrostatic printer instead of delivering regular-sized papers in an ordinary automatic paper-loading tray.

2. Description of the Background Art

Generally, the electrostatic printer prints automatically and sequentially on regular-sized papers delivered from a paper-loading tray. However, it is sometimes necessary to manually supply an electrostatic printer with irregular-sized papers instead of regular-sized papers. FIGS. 2 and 3 illustrate two kinds of conventional apparatuses for manually delivering irregular-sized copying paper.

Referring to FIG. 2, the radii of a pickup roll 20 are not uniform, so that a gap is formed between the smallest radius of the pickup roll 20 and the paper placed on the uppermost part of the paper-loading tray 11. When putting irregular-sized paper into the gap, the pickup roll 20 causes the paper to enter into the printer by way of a pad 21. One of the drawbacks of the conventional apparatus is that manufacture of a pickup roll is very difficult because the pickup roll has nonuniform radii throughout the overall surface from the axis of the pickup roll. Moreover, when the pickup roll 20 is in a stand by status, additional mechanism is needed for adjusting the pickup roll 20. The adjustment is such that the circumferential portion of the pickup roll 20 with the shortest radius focus towards the paper-loading tray 11 so that the gap is formed between the pickup roll 20 and the paper placed on the uppermost portion of the paper-loading tray 11.

Referring to FIG. 3, additional pickup rolls 30 are provided over a pickup roll 25 for manually delivering paper. A paper sheet in the paper-loading tray 11 is delivered into the electrostatic printer by the pickup roll 25, while the irregular-sized papers are delivered one by one into the printer by the additional pick-up rolls 30 by way of a guide 31. One of the drawbacks of the conventional apparatus illustrated in FIG. 3 is that the two pick-up rolls 30 as well as the mechanisms for driving them must be supplied in addition to the standard pickup roll 25.

SUMMARY OF THE INVENTION

The object of the present invention is to provide a manual paper-loading device for an electrostatic printer, wherein a pickup roll having a constant radius in contrast to a conventional pick-up roll having nonuniform radii is used in order to automatically deliver the regular-sized papers in the paper-loading tray and in order to manually deliver irregular-sized papers one by one.

According to the present invention, a paper-loading device in an electrostatic printer for manually loading papers heaped up or stacked in a manual paper feeder in sheets includes the following. The device has at least an automatic paper-loading tray for loading a plurality of stats in the automatic paper-loading tray, for sequentially delivering the stacked sheets in the automatic paper-loading device into the electrostatic printer, a tray cover for covering an upper part of the automatic paper-loading tray except for an outlet. The outlet is needed for discharging the papers piled up in the automatic paper-loading tray into the electrostatic printer. The device also has a pressure lever for upwardly pushing the papers piled up in the automatic paper-loading tray, a frame for mounting the automatic paper-loading tray on the electrostatic printer, having a roll for sequentially delivering the papers exposed on the outlet of the automatic paper-loading tray into the electrostatic printer. The device also has a manual paper-feeder mounted on the cover, which is moved towards the outlet or away from the outlet, for delivering the papers piled up in the manual paper feeder into the electrostatic printer. This prevents contact between the papers piled up in the automatic paper-loading tray and the roll. This permits the papers piled up in the manual paper feeder to be in contact with the roll and prevents the papers piled up in the automatic paper-loading tray from contacting the roll. The device further has a sensor for sensing the movement of the manual paper feeder, whereby the manual paper feeder is moved towards the outlet in order to provide contact between the papers piled up in the manual paper feeder and the roll.

BRIEF DESCRIPTION OF THE DRAWINGS

For a better understanding of the invention and to show how the same may be carried into effect, reference will now be made, by way of example, to the accompanying diagrammatic drawings, in which.

DETAILED DESCRIPTION OF THE PREFERRED EMBODIMENT

The present invention will now be described with reference to the drawings attached only by way of example.

Figure 1:
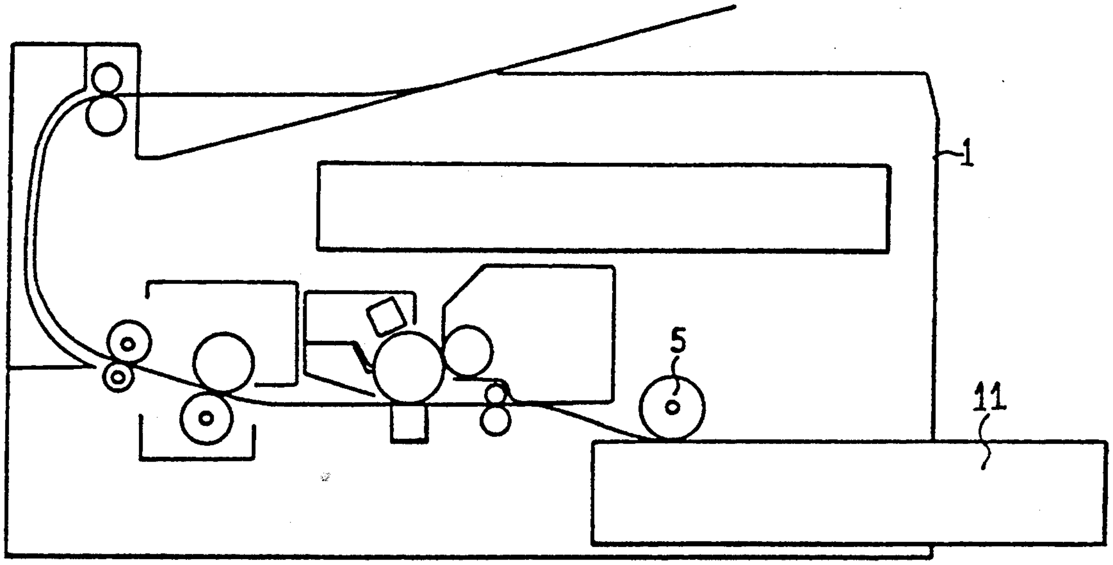
(PRIOR ART) FIG. 1
FIG. 1 schematizes a conventional electrostatic printer.
Figure 2:
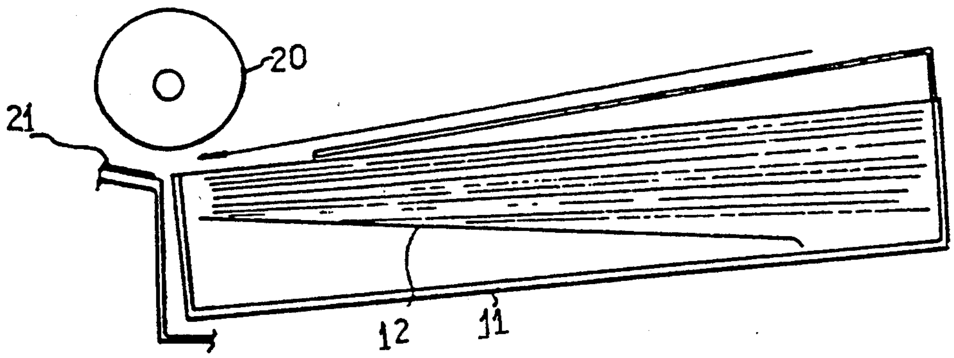
(PRIOR ART) FIG. 2
FIG. 2 is a cross-sectional view of a conventional paper-loading device.
Figure 3:
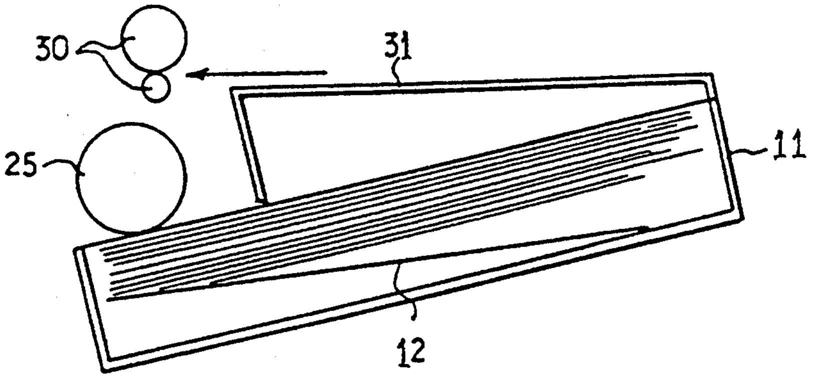
(PRIOR ART) FIG. 3
FIG. 3 is a cross-sectional view of another conventional paper-loading device.
Figure 4:
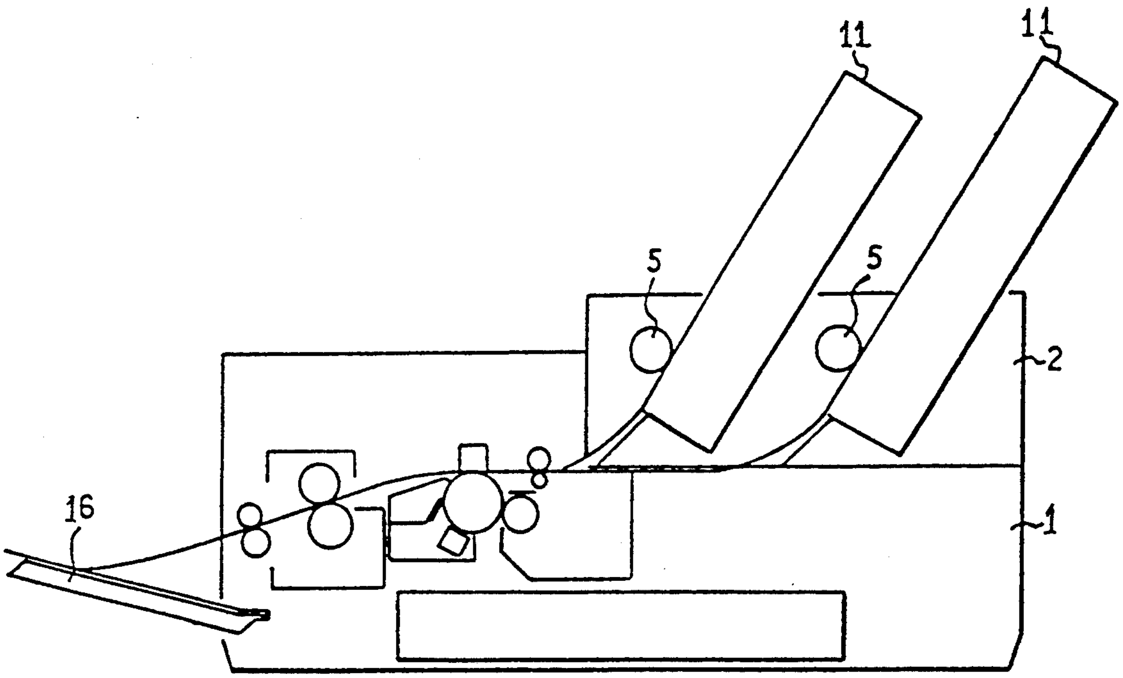
FIG. 4 schematizes an electrostatic printer having a paper-loading device of the present invention.

Referring to FIG. 4, a frame 2 of an ordinary automatic paper-loading device is mounted on a main frame 1 of a printer. An automatic paper-loading tray 11 is slantingly (i.e., deliquely) inserted into the frame 2. The automatic paper-loading tray 11 loads a number of papers of a regular size, which are automatically and sequentially delivered into the printer by a roll 5. The paper is finally collected at a batch tray 16 after being printed.

Figure 5:
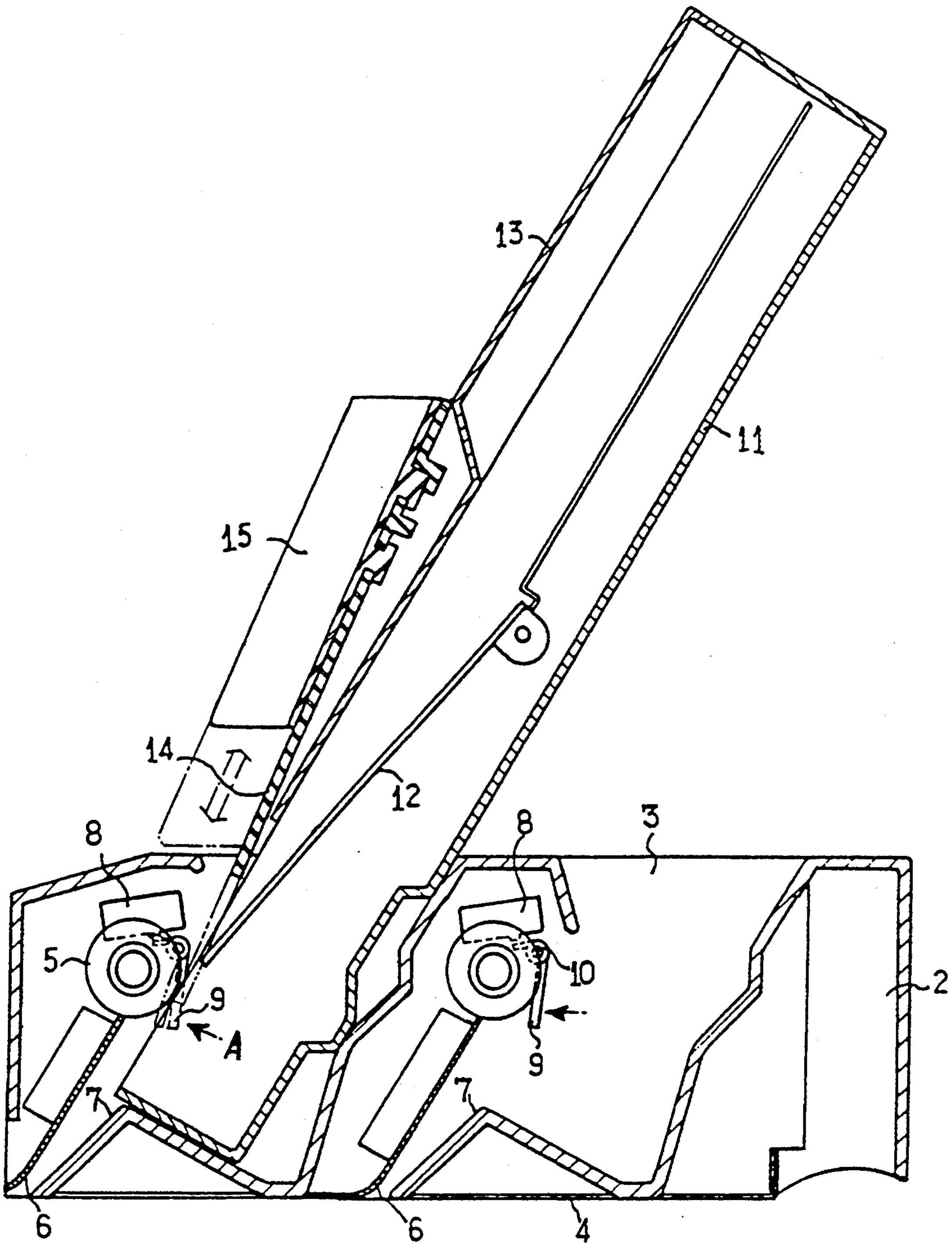
FIG. 5 schematizes a cross-section of the inventive paper-loading device.

Referring to FIG. 5, the frame 2 has two openings 3 for mounting the paper loading trays 11 provided on the frame 2. In one side of the opening 3, a supporting member 4 is provided for supporting the paper-loading tray 11. The roll 5 is placed opposite to the supporting member 4. A lever 9 and a sensor 8 for sensing forwarding of a stand 14 are placed just beside the roll 5, the lever 9 being pivoted on a pin 10. Below the roll 5, a guide 6 is provided, forming a guide passage 7 in association with one end portion of the supporting member 4. In the automatic paper-loading tray 11, a pressure lever 12 is provided for upwardly pushing the papers. The upper part of the automatic paper-loading tray 11 is covered with a tray cover 13 except for an outlet for the papers. A manual paper feeder including a stand 14 and a guide 15 is mounted on the cover 13, and it moves towards or away from the outlet.

When the paper-loading tray 11 is inserted into the opening 3, and when the manual paper feeder on the cover 13 moves away from the outlet, the uppermost one of the papers pushed by the pressure lever 12 in the automatic paper-loading loading tray 11 contacts with the roll 5. Hence, if the roll 5 rotates, the papers supplied from the paper loading tray 11 are sequentially delivered one by one into the printer through the guide passage 7.

If an irregular-sized paper instead of the regular-sized papers in the automatic paper loading tray 11 is to be delivered into the printer, the manual paper feeder should be moved forwardly to the frame 2 as indicated by dotted lines in FIG. 5 so that the stand 14 may prevent the contact between the roll 5 and the papers in the automatic paper-loading tray 11. At this time, the stand 14 drives or actuates the lever 9 as well as the sensor 8. Subsequently, if the irregular-sized paper is put between the roll 5 and the stand 14, the rotation of the roll pushes the copying paper provided in the manual paper feeder into the printer. In addition, both sides of the guide 15 can be flexibly adjusted so as to accommodate variable widths of the irregular-sized papers.

The foregoing description shows only a preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. A paper-loading device for an electrostatic printer for enabling loading of first-sized paper sheets and second-sized paper sheets, said device comprising:

an automatic paper-loading tray for loading the second-sized paper sheets, the second-sized paper sheets being stacked in said automatic paper-loading tray and being sequentially delivered into said electrostatic printer;

means for covering a substantial portion of an upper part of said automatic paper-loading tray whereby an outlet within a region of said upper part not covered by said covering means is provided for discharging the second-sized paper sheets into said electrostatic printer;

a pressure lever for upwardly pushing the second-sized paper sheets;

a frame for mounting said automatic paper-loading tray;

a roller mounted on said frame and being positioned entirely within a region of said upper part not covered by said covering means when the automatic paper-loading tray is fully inserted into the electrostatic printer, said roller being held by an axis of rotation spaced apart from said paper-loading tray to engage and sequentially deliver an exposed sheet of the second-sized paper sheets not covered by said covering means at said outlet into the electrostatic printer;

manual paper-feeding means slidably mounted on said cover to be selectively moved towards said roller and away from said roller to enable delivery of the first-sized paper sheets into said electrostatic printer by preventing contact between said second-sized paper sheets and said roller so that the first-sized paper sheets contact said roll, wherein an upper surface of said manual paper-feeding means always defines a tangent to an outer circumference of said roller and said axis of said roller does not pivot in response to said manual paper-feeding means being fully slid towards said roller; and means for sensing the movement of said manual paper-feeding means.

2. A paper-loading device for an electrostatic printer having a manual override, said paper loading device comprising:

a paper loading tray, a pressure lever mounted in said paper loading tray, and a tray cover providing an outlet from said paper loading tray whereby at least one sheet of a first paper loaded on said pressure lever is available for removal through said outlet by a roller, said roller being mounted in the electrostatic printer within a region above the outlet when the paper loading tray is fully inserted into the electrostatic printer; and a stand affixed to an outer surface of said tray cover, said stand providing an elongate outer surface defining a tangent to an outer circumference of said roller and being selectively positioned to travel along said tangent to open and close said outlet to said roller whereby said stand being in a closed position prevents said at least one sheet of said first paper from being removed from said paper loading tray by said roller and permits at least one sheet of a second paper loaded on said stand to be removed from said stand by said roller, said roller not pivoting in response to said stand being positioned to close said outlet.

3. The paper-loading device of claim 2, wherein said roller has a constant radius between a circumferential surface of said roller and an axis of rotation of said roller.

4. The paper-loading device of claim 2 wherein said first paper and said second paper are different sizes.

5. The paper-loading device of claim 4 further comprising adjustable guides to accommodate a width of said second paper.

6. A paper-loading apparatus for a paper printing device, said apparatus comprising:

a paper tray for holding a stack of paper sheets;

a paper tray cover for covering a substantial portion of an upper part of said paper tray and defining an outlet within a region of said upper part not covered by said paper tray cover;

a frame for supporting said paper tray;

a roller for engaging and transporting an exposed one of the paper sheets through said outlet and into said paper printing device, said roller being positioned entirely within a zone above said outlet when said paper tray is fully inserted into said frame; and manual paper-feeding means mounted on said paper tray cover and comprising an elongate member having a leading edge, said elongate member adapted to slide tangentially to an outer circumference of said roller, said manual paper feeding means having a first position in which said leading edge is spaced away from said roller, and having a second position in which said leading edge is disposed between said roller and said exposed sheet, wherein said roller does not pivot in response to said manual paper-feeding means being slid into said second position.

7. A paper-loading apparatus as claimed in claim 6, wherein said outer circumference of said roller is positioned entirely between a forward end of said paper tray and a forward end of said paper tray cover.

8. A paper-loading apparatus as claimed in claim 6, wherein said roller has a constant radius between said outer circumference and said axis of rotation.

9. A paper-loading apparatus for a paper printing device, said apparatus comprising:

a paper tray for holding a stack of paper sheets and having an outlet through which individual said from the stack of paper sheets are discharged into said paper printing device;

a frame for supporting said paper tray;

a roller for sequentially engaging and transporting exposed individual sheets from the stack of paper sheets through said outlet and into said paper printing device, said roller being positioned entirely within a zone above said outlet when said paper tray is fully inserted into said frame; and manual paper-feeding means slidably mounted on an upper portion of said paper tray to be translated between a first position and a second position, said manual paper-feeding means enabling contact between said exposed one of said paper sheets and said roller while said manual paper-feeding means is in said first position, said manual paper feeding means placing a leading edge of an elongate upper surface of said manual paper-feeding means between said exposed sheet and said roller so that individual paper sheets manually provided on said elongate upper surface can be engaged by said roller while said manual paper-feeding means is in said second position, and said elongate upper surface remains tangential to an outer circumference of said roller during translation between said first position and said second position.

10. A paper-loading apparatus as claimed in claim 9, wherein said outer circumference of said roller is positioned entirely between a forward end of said paper tray and a forward end of said paper tray cover.

11. A paper-loading apparatus as claimed in claim 8, wherein said roller has a constant radius between said outer circumference and said axis of rotation.

12. A paper-loading apparatus as claimed in claim 8, wherein said axis of said roller does not pivot in response the translation of said manual paper-feeding means between said first position and said second position.

13. A paper-loading apparatus for a paper printing device, said apparatus comprising:

first paper holding means comprising spaced-apart end walls separated by a bottom, and a cover extended from a first one of said end walls and toward a second one of said end walls while providing an outlet defined between said cover and said second one of said end walls, for retaining and sequentially delivering through said outlet individual sheets positioned topmost within a stack of individual sheets retained within said first paper holding means;

a frame comprising spaced-apart sides supporting a top surface perforated by an opening accommodating insertion of said first paper holding means with said second one of said end walls positioned within said frame and below said top surface;

a roller for serially engaging and directly transporting the individual sheets positioned topmost with the stack and exposed to said roller, through said outlet and into said paper printing device, said roller being spaced-apart from said second end wall and positioned entirely within a zone above said outlet when said first paper holding means is fully inserted into said frame; and second paper holding means having an elongate upper surface, said second paper holding means being slidably mountable on an upper portion of said first paper holding means to shift between a first position and a second position, for enabling sequential said delivering through said outlet of individual sheets positioned topmost within a stack of individual sheets retained with said first paper holding means while said second paper holding means is in said first position, and for while in said second position placing a leading edge of said elongate upper surface between the stack retained within said first paper holding means and said roller so that individual paper sheets provided on said elongate upper surface can be engaged by said roller, said elongate upper surface being tangential to an outer circumference of said roller during translation between said first position and said second position.

14. The apparatus of claim 13, further comprising:

means disposed within said first paper holding means for continuously urging the stack of individual sheets retained within said first paper holding means toward said roller.

15. The apparatus of claim 13, further comprising:

said top surface limiting travel of said second paper holding means as said second paper holding means shifts from said first position to said second position.

16. The apparatus of claim 13, further comprising said leading edge separating the individual sheets positioned topmost within the stack from said roller while said second paper holding means is in said second position.

17. The apparatus of claim 13, further comprising:

means disposed within said first paper holding means, for continuously urging individual sheets of paper retained within said first paper holding means toward said roller; and said leading edge separating the individual sheets retained within said first paper holding means from the roller while said second paper holding means is in said second position.

18. A paper-loading apparatus for a paper printing device, said apparatus comprising:

first paper holding means comprising spaced-apart end walls separated by a bottom, and a cover extended from a first one of said end walls and toward a second one of said end walls while providing a first outlet defined between said cover and said second one of said end walls, for retaining and sequentially delivering through said outlet individual sheets positioned topmost within a stack of individual sheets retained within said first paper holding means;

second paper holding means comprising spaced-apart end walls separated by a bottom and a cover extending from a first one of said end walls and toward a second one of said end walls while providing a second outlet defined between said cover and said second one of said end walls, for retaining and sequentially delivering through said outlet individual sheets positioned topmost within a stack of individual sheets retained within said second paper holding means;

a frame comprising spaced-apart sides supporting a top surface perforated by a plurality of spaced-apart openings accommodating individual insertions of said first paper holding means and said second paper holding means with said second one of said end walls positioned within said frame and below said top surface;

a first roller for serially engaging and transporting into a path extending through said device the individual sheets positioned topmost with the stack retained within said first paper holding means and exposed to said roller, through said first outlet and into said path, said roller being spaced-apart from said second end wall of said first paper holding means and positioned entirely within a zone above said outlet when said second one of said end walls of said first paper holding means engages said frame;

a second roller for serially engaging and transporting into a path the individual sheets positioned topmost with the stack retained within said second paper holding means and exposed to said roller, through said second outlet and into said path, said second roller being spaced-apart from said second end wall of said second paper holding means and positioned entirely within a zone above said second outlet when said second one of said end walls of said second paper holding means engages said frame; and third paper holding means having an elongate upper surface, said third paper holding means being slidably mountable on an upper portion of said first paper holding means to shift between a first position and a second position, for enabling sequential said delivering through said first outlet of individual sheets positioned topmost within a stack of individual sheets retained with said first paper holding means while said third paper holding means is in said first position, and for while in said second position placing a leading edge of said elongate upper surface between the stack retained within said first paper holding means and said first roller so that individual paper sheets provided on said elongate upper surface can be engaged by said first roller, said elongate upper surface being tangential to an outer circumference of said first roller during translation of said third paper holding means between said first position and said second position.

19. The apparatus of claim 18, further comprising:

means disposed within said first paper holding means, for continuously urging individual sheets of paper retained within said first paper holding means toward said roller; and said leading edge separating the individual sheets retained within said first paper holding means from the roller while said second paper holding means is in said second position.

20. A paper-loading process for a paper printing device, said process comprising:

retaining a plurality of sheets of paper within a stack within first paper holding means comprising spaced-apart end walls separated by a bottom, and a cover extended from a first one of said end walls and toward a second one of said end walls while providing an outlet defined between said cover and said second one of said end walls;

sequentially delivering through said outlet individual sheets positioned topmost within said stack of individual sheets retained within said first paper holding means;

inserting said first paper holding means within a frame comprising spaced-apart sides supporting a top surface perforated by an opening accommodating insertion of said first paper holding means with said second one of said end walls positioned within said frame and below said top surface;

serially engaging and directly transporting with a circumferential surface of a roller having a constant diameter, the individual sheets positioned topmost with the stack and exposed to said roller, through said outlet and into said paper printing device with said roller being spaced-apart from said second end wall and positioned entirely within a zone above said outlet while said first paper holding means is fully inserted into said frame; and slidably mounting second paper holding means having an elongate upper surface, upon an exterior portion of said first paper holding means;

shifting said second paper holding means between a first position and a second position, to enable sequential said delivering through said outlet of individual sheets positioned topmost within a stack of individual sheets retained with said first paper holding means while said second paper holding means is in said first position, and to enable while in said second position placement of a leading edge of said elongate upper surface between said exposed sheet and said roller so that individual paper sheets provided on said elongate upper surface can be engaged by said roller; and maintaining said elongate upper surface tangential to an outer circumference of said roller during translation of said second paper holding means between said first position and said second position.

* * * * *